(12) United States Patent
Chong

(10) Patent No.: US 11,805,758 B2
(45) Date of Patent: Nov. 7, 2023

(54) MULTIFUNCTIONAL BIRDHOUSE

(71) Applicant: Chia Wern Chong, Rego Park, NY (US)

(72) Inventor: Chia Wern Chong, Rego Park, NY (US)

( * ) Notice: Subject to any disclaimer, the term of this patent is extended or adjusted under 35 U.S.C. 154(b) by 34 days.

(21) Appl. No.: 17/498,585

(22) Filed: Oct. 11, 2021

(65) Prior Publication Data
US 2022/0110300 A1     Apr. 14, 2022

Related U.S. Application Data

(60) Provisional application No. 63/089,888, filed on Oct. 9, 2020.

(51) Int. Cl.
| | | |
|---|---|---|
| *A01K 31/14* | (2006.01) | |
| *A01K 39/014* | (2006.01) | |
| *A01K 31/12* | (2006.01) | |

(52) U.S. Cl.
CPC ............ *A01K 31/14* (2013.01); *A01K 39/014* (2013.01); *A01K 31/12* (2013.01)

(58) Field of Classification Search
CPC ........ A01K 31/14; A01K 31/12; A01K 31/04; A01K 39/014
USPC .......................................... 119/428, 429, 432
See application file for complete search history.

(56) References Cited

U.S. PATENT DOCUMENTS

| | | | | |
|---|---|---|---|---|
| 1,303,736 A | * | 5/1919 | Speicher ................ | A01K 31/18 119/487 |
| 1,345,968 A | * | 7/1920 | Speicher ................ | A01K 31/22 119/487 |
| 3,295,498 A | | 1/1967 | Brown | |
| 4,167,917 A | | 9/1979 | Noll | |
| 5,671,697 A | * | 9/1997 | Rutman ................ | A01K 15/02 119/472 |
| 5,769,026 A | * | 6/1998 | Kohn ................... | A01K 1/0107 119/165 |
| 6,109,211 A | * | 8/2000 | Tomlinson ........... | A01K 1/0107 119/165 |
| 6,367,420 B1 | * | 4/2002 | Tomlinson ........... | A01K 1/0107 119/165 |
| 6,854,423 B2 | | 2/2005 | Missry | |

(Continued)

OTHER PUBLICATIONS

Duncraft, Duncraft Cardinal Bird House, <https://www.duncraft.com/Duncraft-Cardinal-Bird-House>.

(Continued)

*Primary Examiner* — Philip J Bonzell
*Assistant Examiner* — Maria E Graber

(57) ABSTRACT

A multifunctional birdhouse can be configured into a birdhouse or a birdfeeder and provides easy cleaning access. The multifunctional birdhouse comprises a birdhouse enclosure and a reversible drawer. The birdhouse enclosure is the main structural housing for the multifunctional birdhouse. The reversible drawer allows the multifunctional birdhouse to be configured as a birdhouse or a birdfeeder based on the orientation of the reversible drawer when engaged to the birdhouse enclosure. The reversible drawer can be slid into and out of the birdhouse enclosure when desired. Further, the reversible drawer allows for easy cleaning of the multifunctional birdhouse due to the capability to detach the reversible drawer from the birdhouse enclosure when desired.

17 Claims, 12 Drawing Sheets

(56) References Cited

U.S. PATENT DOCUMENTS

| | | | | |
|---|---|---|---|---|
| 7,500,449 B2* | 3/2009 | Carter | ................... | A01K 31/14 |
| | | | | 119/462 |
| 8,925,491 B2* | 1/2015 | Glover | ................ | A01K 1/0245 |
| | | | | 119/497 |
| 10,194,642 B2 | 2/2019 | Ellis et al. | | |
| 10,463,025 B2 | 11/2019 | Donegan et al. | | |
| 10,834,892 B2* | 11/2020 | Chen | ................... | A01K 1/0157 |
| 2003/0168017 A1* | 9/2003 | Perelli | ................ | A01K 1/0107 |
| | | | | 119/165 |
| 2013/0055959 A1* | 3/2013 | Spectre | ............... | A01K 1/0107 |
| | | | | 119/165 |

OTHER PUBLICATIONS

Momma's Home Store, Convertible Roosting Cedar Bird House, <https://mommashomestore.com/products/convertible-roosting-cedar-bird-house>.

* cited by examiner

MULTIFUNCTIONAL BIRDHOUSE

The current application claims a priority to the U.S. Provisional Patent application Ser. No. 63/089,888 filed on Oct. 9, 2020. The current application is filed on Oct. 11, 2021, while Oct. 9, 2021, was on a weekend.

FIELD OF THE INVENTION

The present invention relates generally to birdhouses. More specifically, the present invention is a multifunctional birdhouse that can be configured as a birdhouse or a birdfeeder and provides easy cleaning access.

BACKGROUND OF THE INVENTION

Hanging a birdhouse would make it easier for many types of birds to find shelter. However, cleaning the birdhouse after each nesting/breeding season may become a tedious task depending on the shape and structure of a birdhouse. Further, most birdhouses will be left empty as the migratory birds (or any birds) leave the birdhouse after the nesting or breeding season. Thus, a birdhouse which may be used all around the year, and which has convertible components that enable multiple functionalities and an easy access for cleaning is a rare find in the current market.

An objective of the present invention is to provide users with a multifunctional birdhouse. It is an aim of the present invention to be able to make use of the birdhouse throughout the year, and even during non-nesting season. In order to accomplish that, the present invention comprises a pull-out tray, which may be reversed to convert the birdhouse into a birdfeeder. Further, the present invention enables users to clean the bird house with ease, by pulling out the pull-out tray completely. Furthermore, the present invention comprises ventholes, drain holes and access holes at various locations of the birdhouse, so as to provide a comfortable nesting environment for the birds. Additionally, the present invention comprises grooves proximate to the entrance/exit hole of the bird house for enabling baby birds to climb up and exit the birdhouse with ease. Thus, the present invention is a durable, multifunctional, and easily cleanable birdhouse and birdfeeder, which is user-friendly for both birds and human beings.

SUMMARY OF THE INVENTION

The present invention is a multifunctional birdhouse. It is an aim of the present invention to be able to make use of the birdhouse throughout the year, and even during non-nesting season. In order to accomplish that, the present invention comprises a pull-out tray, which may be reversed to convert the birdhouse into a birdfeeder. Further, the present invention enables users to clean the bird house with ease, by pulling out the pull-out tray completely. Furthermore, the present invention comprises ventholes, drain holes and access holes at various locations of the birdhouse, so as to provide a comfortable nesting environment for the birds. Additionally, the present invention comprises grooves proximate to the entrance/exit hole of the bird house for enabling baby birds to climb up and exit the birdhouse with ease. Thus, the present invention is a durable, multifunctional, and easily cleanable birdhouse and birdfeeder, which is user-friendly for both birds and human beings.

DETAIL DESCRIPTIONS OF THE INVENTION

All illustrations of the drawings are for the purpose of describing selected versions of the present invention and are not intended to limit the scope of the present invention.

In reference to FIGS. 1 through 12, the present invention is a multifunctional birdhouse that can be configured as a birdhouse or a birdfeeder and provides easy cleaning access. The present invention comprises a birdhouse enclosure 1 and a reversible drawer 12. The birdhouse enclosure 1 is the main structural housing for the present invention. The reversible drawer 12 allows the present invention to be configured as a birdhouse or a birdfeeder based on the orientation of the reversible drawer 12 when engaged to the birdhouse enclosure 1. Further, the reversible drawer 12 allows for easy cleaning of the present invention due to the capability to detach the reversible drawer 12 from the birdhouse enclosure 1 when desired.

Figure 4:
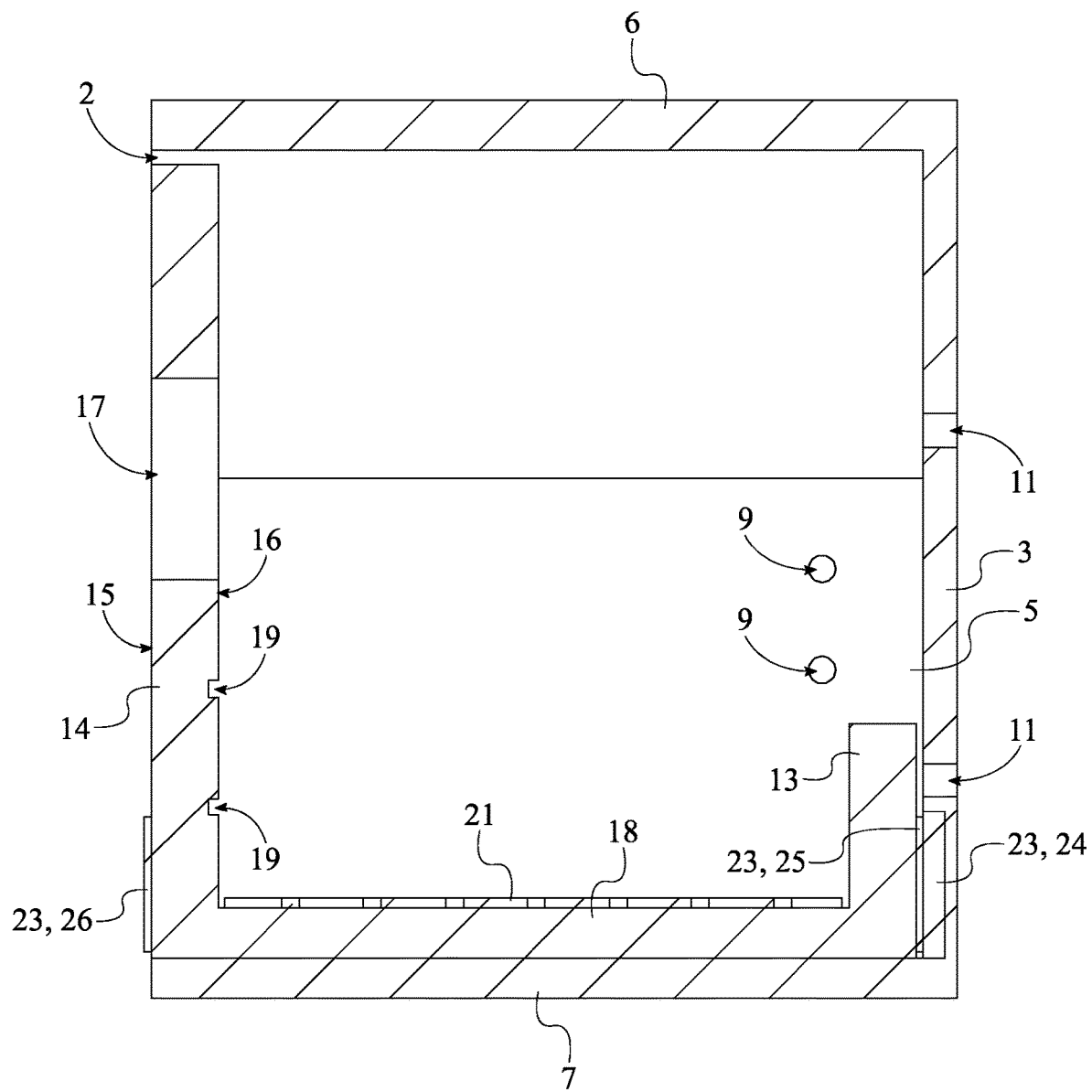
FIG. 4 is a cross-section view of the present invention in the birdhouse configuration taken along line 4-4 from FIG. 3.
Figure 5:
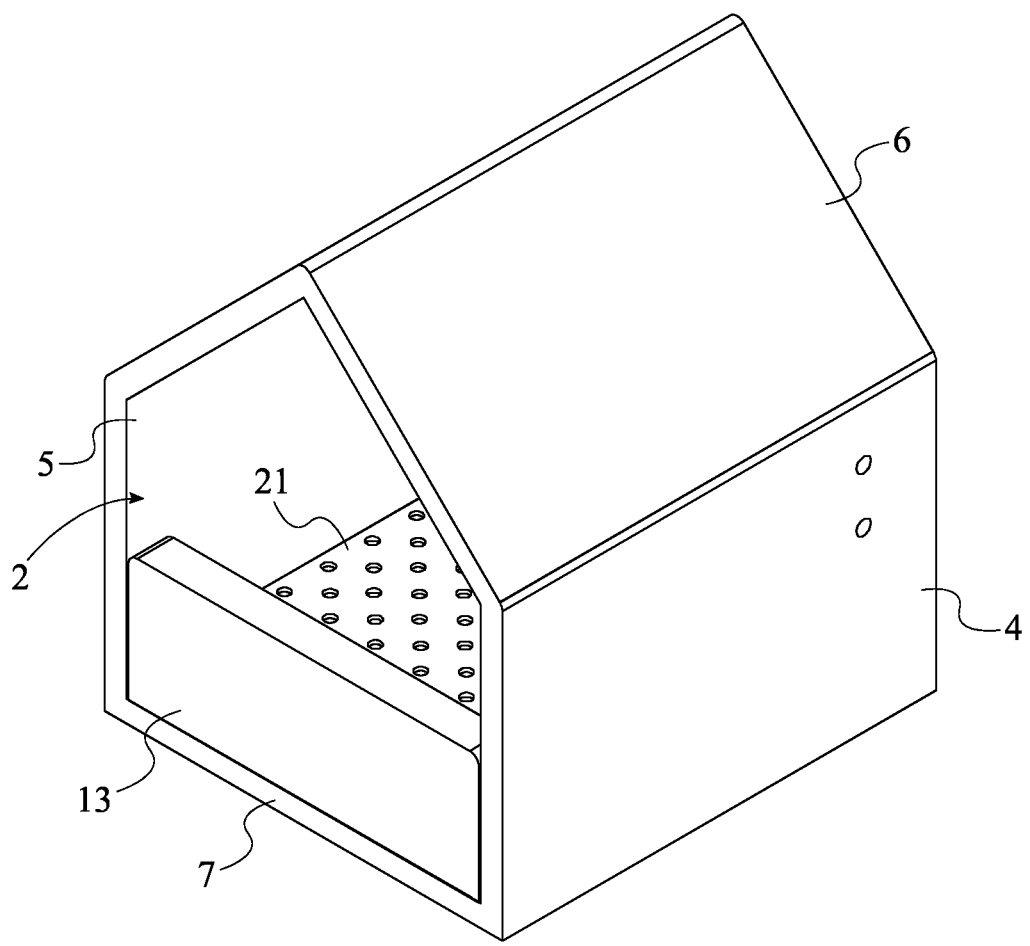
FIG. 5 is a front top perspective view of the present invention in the birdfeeder configuration.
Figure 8:
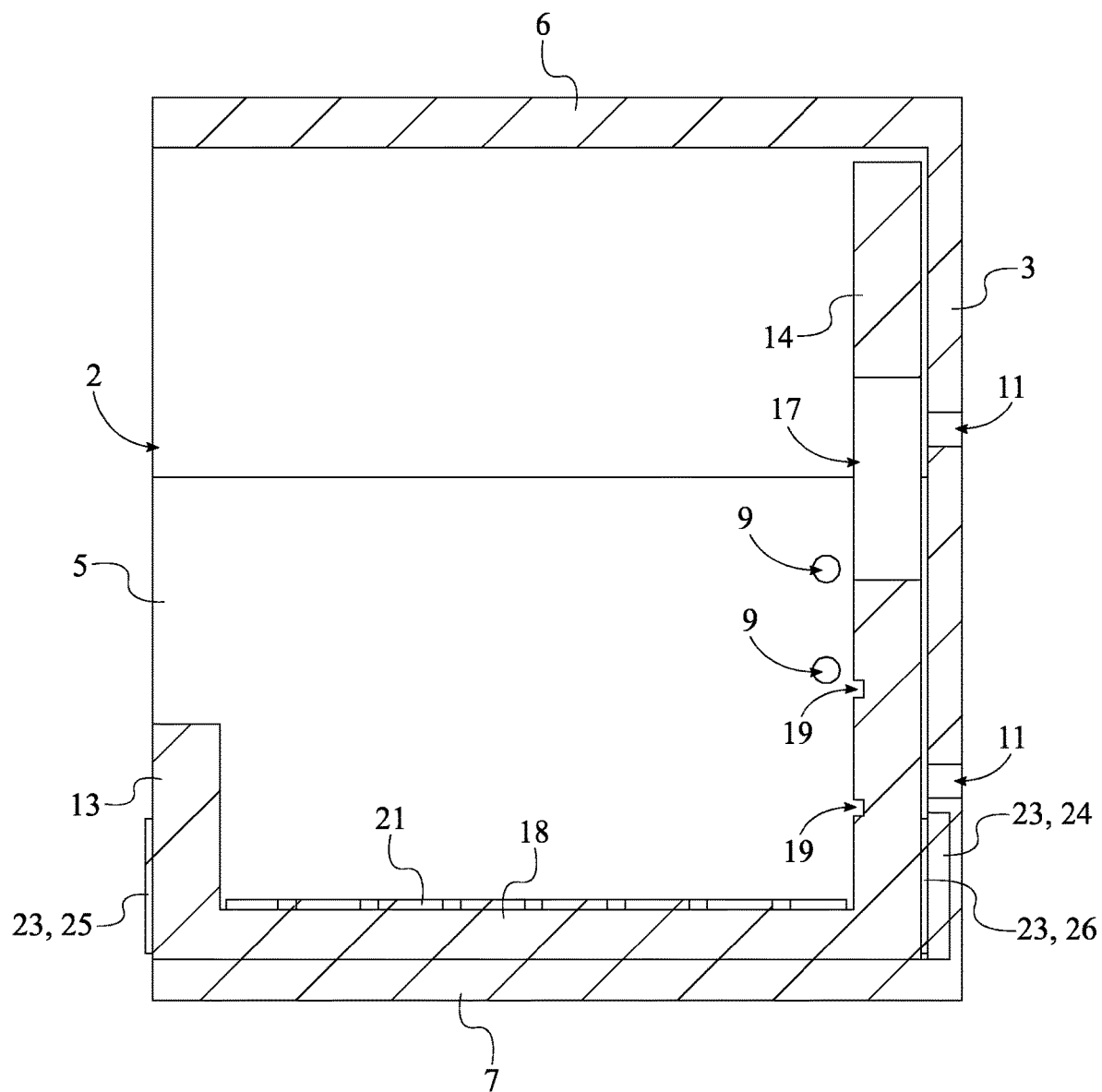
FIG. 8 is a cross-section view of the present invention in the birdfeeder configuration taken along line 8-8 from FIG. 7.

The general configuration of the aforementioned components allows the present invention to be configured as a birdhouse or a birdfeeder and provides easy cleaning access. With reference to FIGS. 1, 2, 5, and 6, the birdhouse enclosure 1 comprises an access hole 2 and an enclosure backing 3. The birdhouse enclosure 1 is preferably designed similar to a conventional birdhouse. However, the birdhouse enclosure 1 can be any size or shape. The access hole 2 allows the birdhouse enclosure 1 to receive the reversible drawer 12. With reference to FIGS. 4 and 8, the enclosure backing 3 is a back panel that the reversible drawer 12 can be pushed against when the birdhouse enclosure 1 is engaged by the reversible drawer 12. The reversible drawer 12 comprises a ledge 13, an enclosing wall 14, an entrance hole 17, and a bottom platform 18. The ledge 13 allows birds to freely enter inside the present invention in order to access birdfeed when the present invention is in a birdfeeder configuration. The enclosing wall 14 acts as a front panel for the birdhouse enclosure 1 when the present invention is in a birdhouse configuration. The entrance hole 17 allows birds to freely enter inside the birdhouse for nesting purposes when the present invention is in the birdhouse configuration. The bottom platform 18 provides a designated area where birds can nest or where birdfeed can be placed. The ledge 13 is connected adjacent to the bottom platform 18 and the enclosing wall 14 is connected adjacent to the bottom platform 18, opposite to the ledge 13. In more detail, this arrangement states that the bottom platform 18, the ledge 13, and the enclosing wall 14 are all structurally one piece with the ledge 13 and the enclosing wall 14 being positioned opposite to each other across the bottom platform 18. Further, the ledge 13, and the enclosing wall 14 can be connected to the bottom platform 18 through use of an adhesive, wooden dowels, or fasteners such as screws or nails. The entrance hole 17 traverses normal through the enclosing wall 14. In more detail, the entrance hole 17 is an opening that fully goes through the thickness of the enclosing wall 14 and the entrance hole 17 is perpendicular to the thickness of the enclosing wall 14. The access hole 2 and the enclosure backing 3 are positioned opposite to each other about the birdhouse enclosure 1. This arrangement states that the access hole 2 is positioned at a front plane of the birdhouse enclosure 1 and the enclosure backing 3 is positioned at a back plane of the birdhouse enclosure 1. Further, the reversible drawer 12 is positioned through the access hole 2 and against the enclosure backing 3. In more detail, the reversible drawer 12 can only be inserted through the access hole 2 and until the reversible drawer 12 is pressed against the enclosure backing 3. Moreover, the reversible drawer 12 is slidably engaged with the birdhouse enclosure 1. This arrangement states the reversible drawer 12 can slide into and out of the birdhouse enclosure 1 when desired. However, the reversible drawer 12 does not easily slide into and out of the birdhouse enclosure 1. Force is required in order to slide the reversible drawer 12 into and out of the birdhouse enclosure 1. Thus, the reversible drawer 12 is restricted from unintentionally sliding out of the birdhouse enclosure 1.

Figure 1:
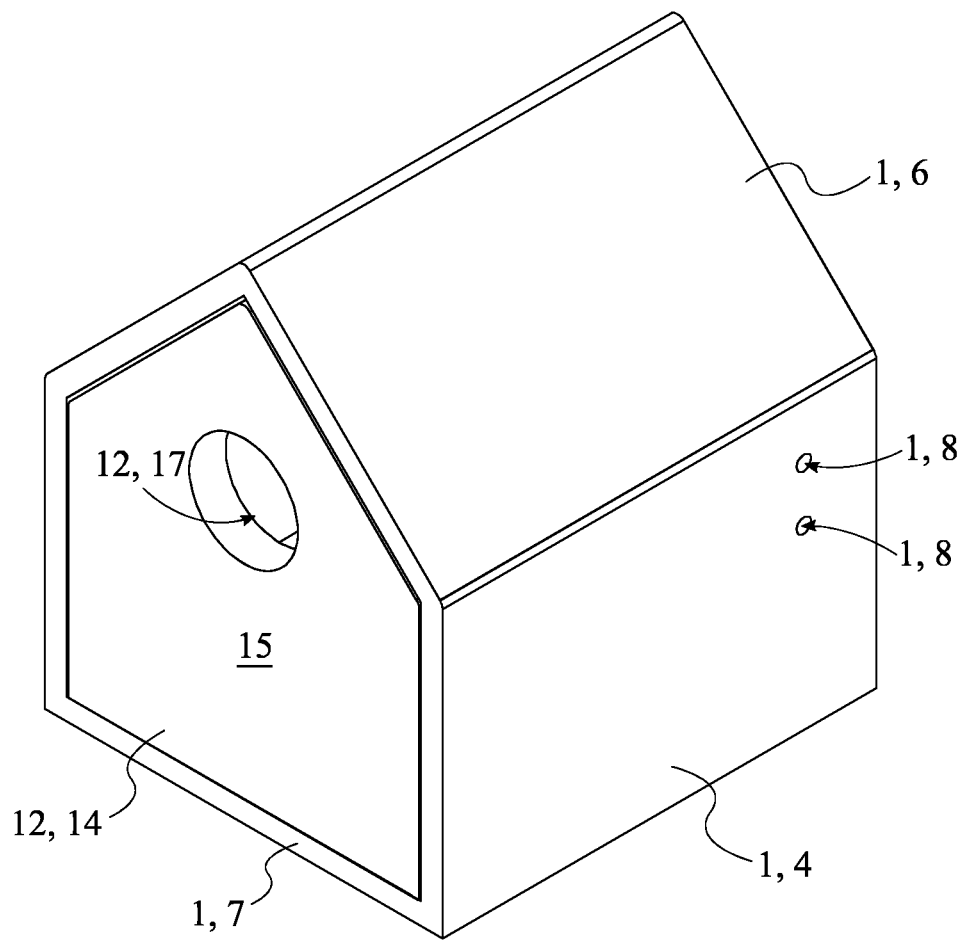
FIG. 1 is a front top perspective view of the present invention in the birdhouse configuration.
Figure 2:
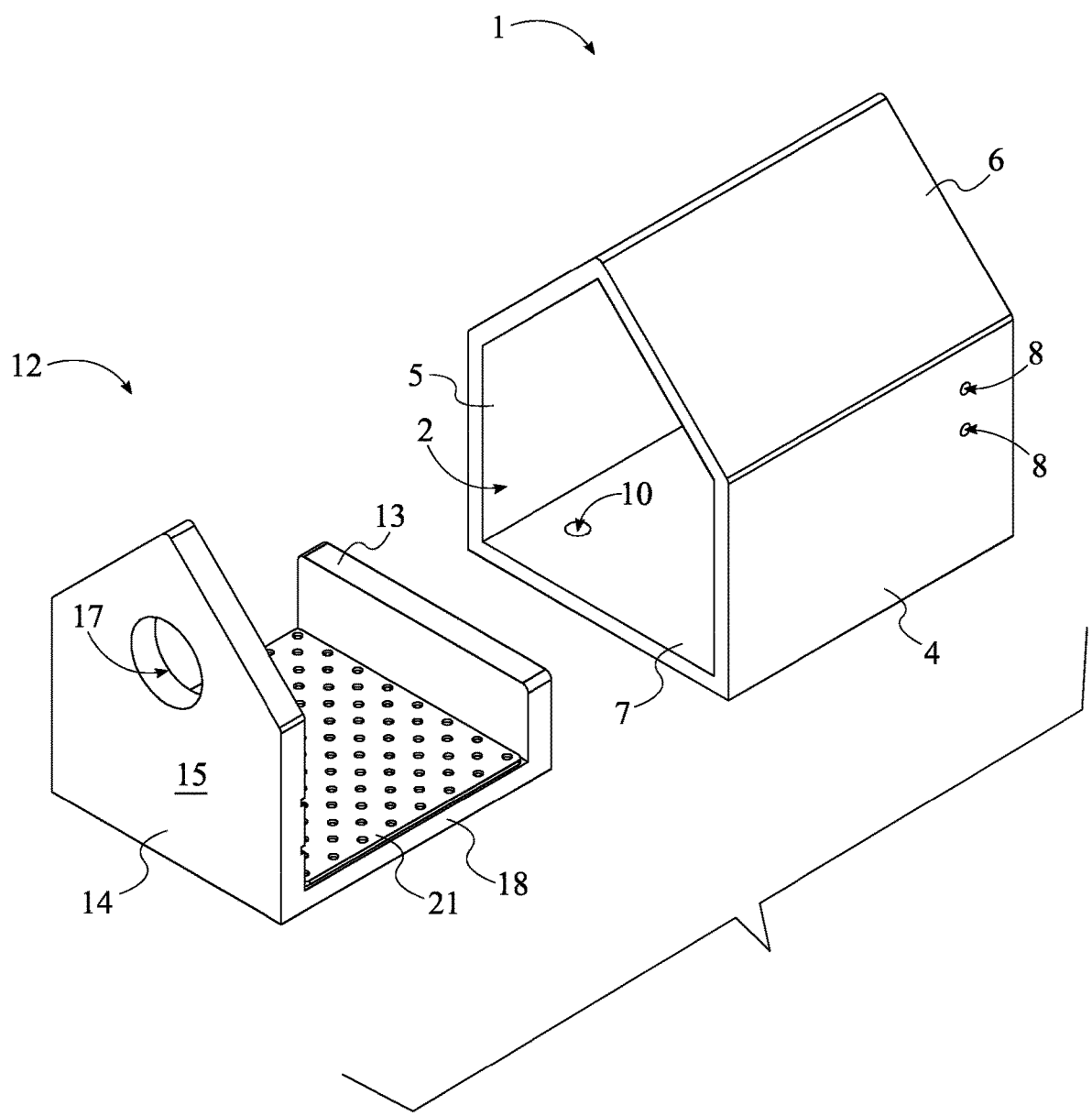
FIG. 2 is an exploded front top perspective view of the present invention in the birdhouse configuration.
Figure 3:
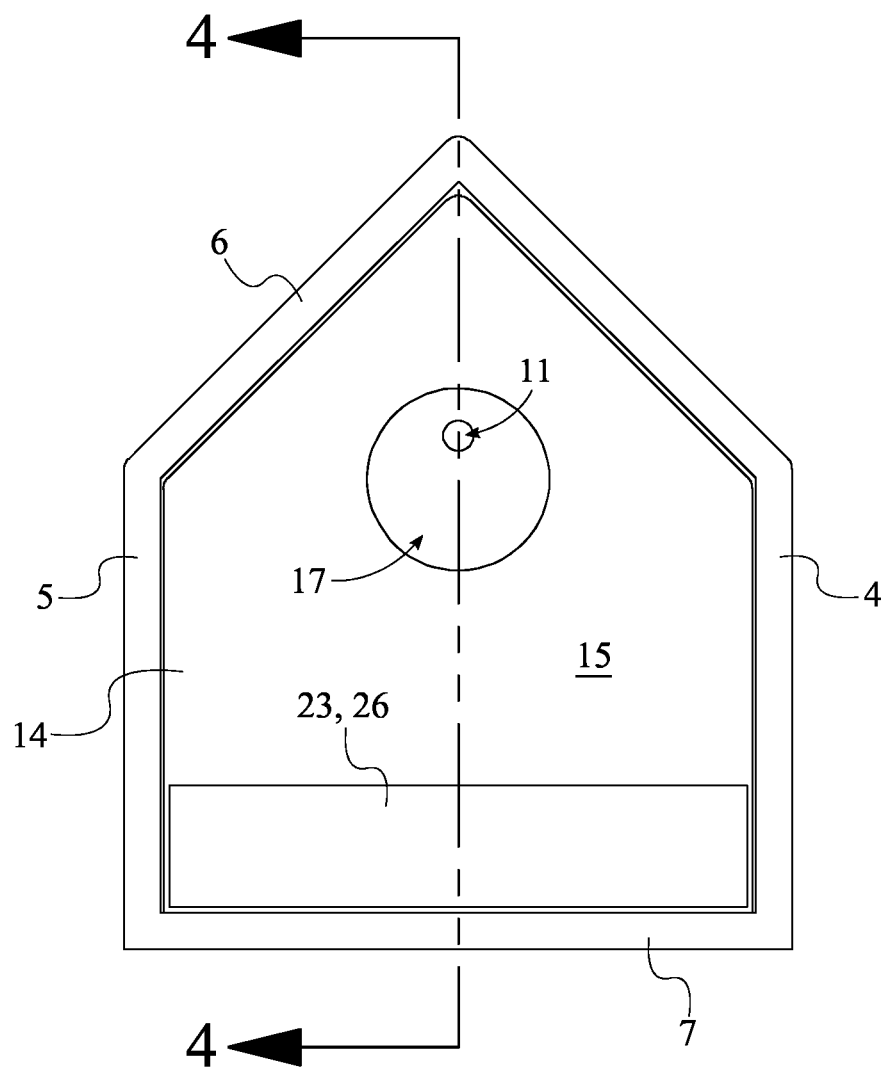
FIG. 3 is a front view of the present invention in the birdhouse configuration.

In order for a bird to easily climb up and exit the birdhouse enclosure 1 through the entrance hole 17 when the present invention is in the birdhouse configuration and with reference to FIGS. 2 and 4, the reversible drawer 12 may further comprise a plurality of elongated grooves 19. The enclosing wall 14 comprises a first wall face 15 and a second wall face 16. The first wall face 15 is positioned at a front plane of the reversible drawer 12 wall and thus, the first wall face 15 is oriented away from the ledge 13. The second wall face 16 is positioned opposite to the first wall face 15 and thus, the second wall face 16 is oriented towards the ledge 13. The plurality of elongated grooves 19 is integrated into the second wall face 16. In more detail, this arrangement positions the plurality of elongated grooves 19 at the wall face of the enclosing wall 14 that is oriented towards the enclosure backing 3 when the present invention is in the birdhouse configuration. The plurality of elongated grooves 19 is positioned in between the entrance hole 17 and the bottom platform 18 and is distributed across the second wall face 16. In more detail, this arrangement allows the plurality of elongated grooves 19 to act similar to steps for a bird from the bottom platform 18 towards the entrance hole 17.

Figure 11:
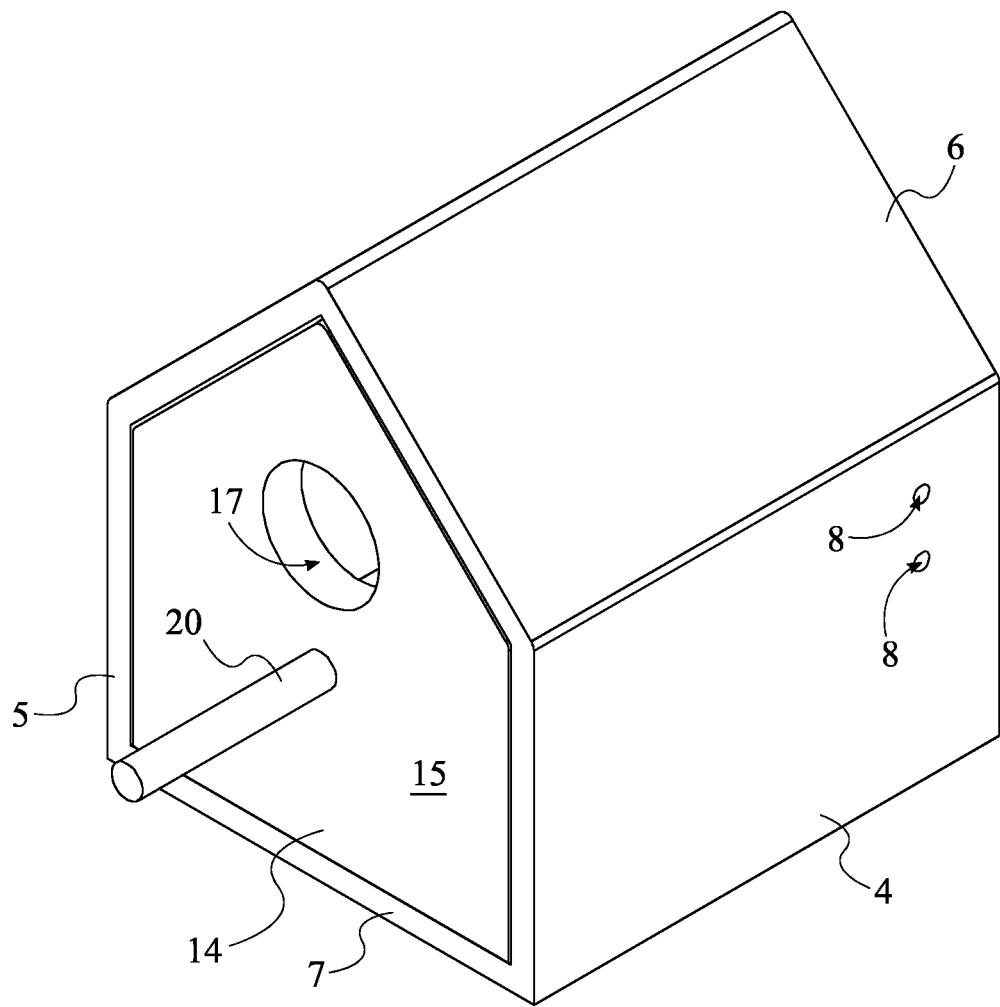
FIG. 11 is a front top perspective view of the present invention in the birdhouse configuration with the removable perch attached.

In order to allow a bird to rest before or after using the present invention as a birdhouse and with reference to FIG. 11, the reversible drawer 12 may further comprise a removable perch 20. The removable perch 20 is attached normal to first wall face 15. This arrangement attaches the removable perch 20, in a perpendicular manner, to the wall face of the enclosing wall 14 that is oriented away from the enclosure backing 3 when the present invention is in the birdhouse configuration. Moreover, the removable perch 20 may be attached to first wall face 15 through various methods such as, but not limited to, magnets, threaded fasteners, or an adhesive. Further, the removable perch 20 is positioned in between the entrance hole 17 and the bottom platform 18. In more detail, the removal perch is positioned below the entrance hole 17 and thus, this arrangement allows a bird to rest before entering or after exiting the present invention through the entrance hole 17. Moreover, the removable perch 20 may be detached when the user desires to use the present invention in the birdfeeder configuration in order to allow the reversible drawer 12 to be fully inserted within the birdhouse enclosure 1.

Figure 6:
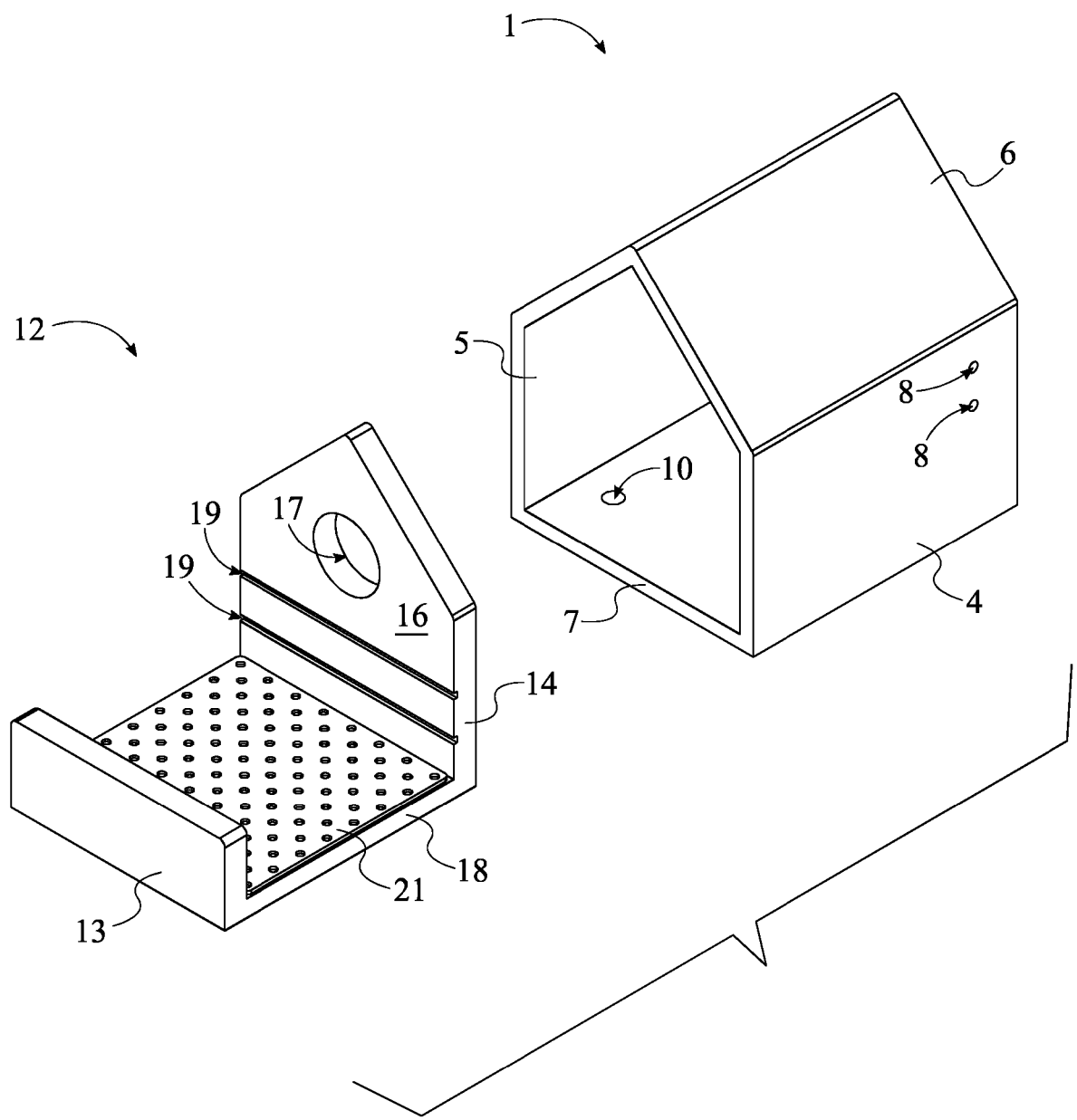
FIG. 6 is an exploded front top perspective view of the present invention in the birdfeeder configuration.
Figure 7:
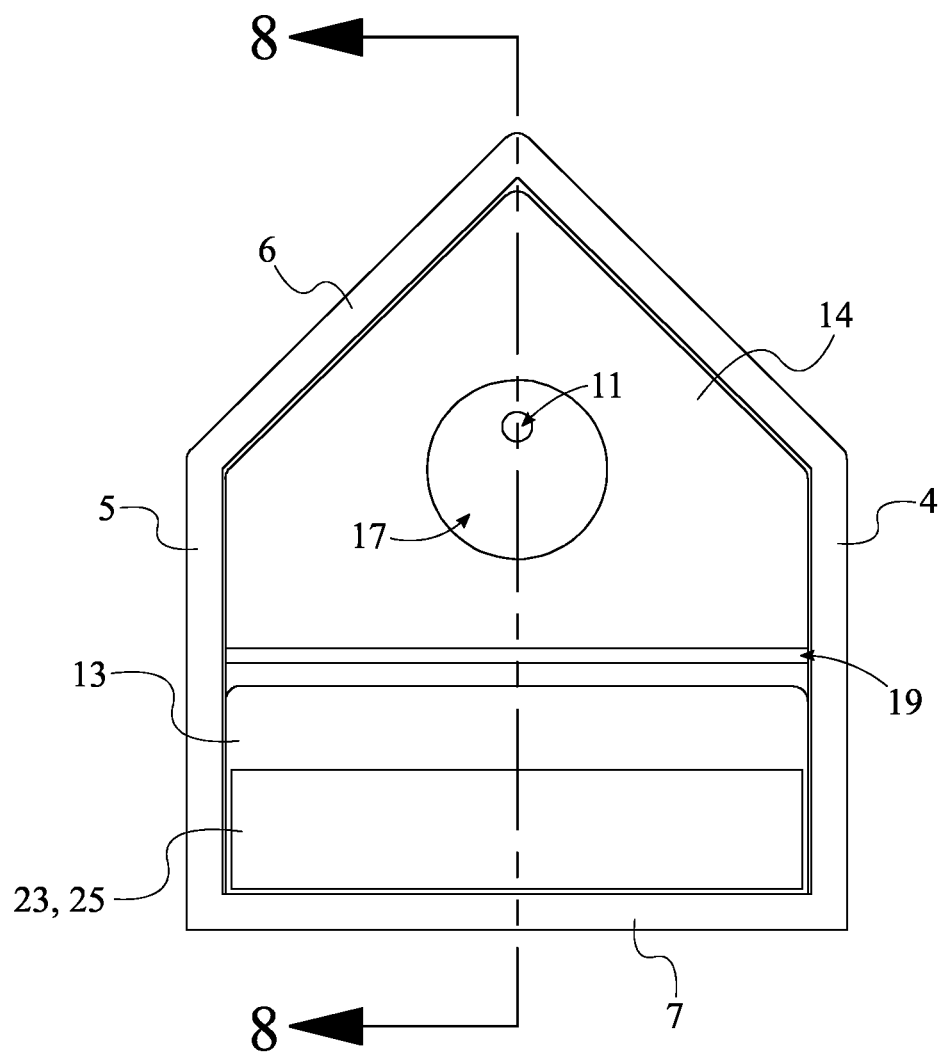
FIG. 7 is a front view of the present invention in the birdfeeder configuration.

In order to collect debris, bird excretions, or other substances or to hold birdfeed and with reference to FIGS. 2 and 6, the reversible drawer 12 may further comprise a mesh sheet 21. The mesh sheet 21 is sized and shaped to fully cover the bottom platform 18 and can be made of any material. Further, the mesh sheet 21 is situated across the bottom platform 18. This arrangement allows the mesh sheet 21 to collect debris, bird excretions, and other substances or hold birdfeed while restricting debris, bird excretions, and other substances or birdfeed from contacting the bottom platform 18. Further, the mesh sheet 21 can easily be removed from the bottom platform 18 and, therefore, the mesh sheet 21 allows the user to easily clean the reversible drawer 12.

Figure 10:
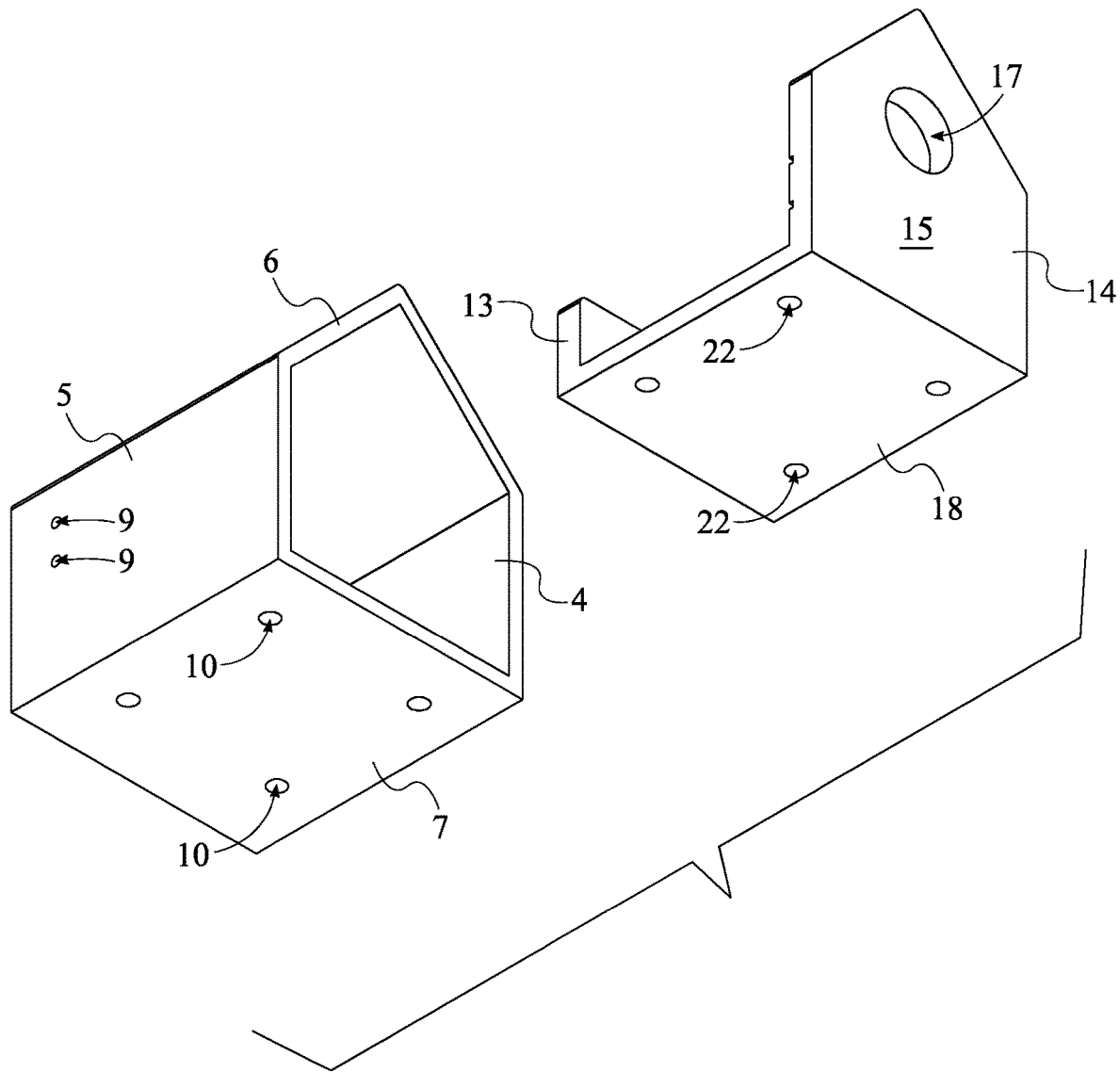
FIG. 10 is an exploded front bottom perspective view of the present invention in the birdhouse configuration.

With reference to FIGS. 2 and 10, the birdhouse enclosure 1 includes most of a design of a conventional birdhouse and thus, the birdhouse enclosure 1 further comprises a first enclosure sidewall 4, a second enclosure sidewall 5, a gable enclosure roof 6, and an enclosure floor 7. The following arrangements provide the birdhouse enclosure 1 with most of the design of a conventional birdhouse. The first enclosure sidewall 4 and the second enclosure sidewall 5 are positioned parallel and offset from each other, the enclosure floor 7 is connected in between the first enclosure sidewall 4, the second enclosure sidewall 5, and the enclosure backing 3, the gable enclosure roof 6 is connected in between the first enclosure sidewall 4, the second enclosure sidewall 5, and the enclosure backing 3, and the gable enclosure roof 6 and the enclosure floor 7 are positioned opposite to each other about the birdhouse enclosure 1. Additionally, these connections can be made through the use of an adhesive, wooden dowels, or fasteners such as screws or nails. However, the present invention differs from a conventional birdhouse because the present invention includes an access hole 2 to receive the reversible drawer 12. The access hole 2 is delineated by the gable enclosure roof 6, the first enclosure sidewall 4, the second enclosure sidewall 5, and the enclosure floor 7. In more detail, the access hole 2 is offset from the outer frame outline of the birdhouse enclosure 1. Thus, the access hole 2 is sized and shaped to receive the reversible drawer 12 and more specifically the enclosing wall 14.

In order to allow air to circulate through and out of the first enclosure sidewall 4 and with reference to FIG. 2, the birdhouse enclosure 1 may further comprise a plurality of first vent holes 8. The plurality of first vent holes 8 traverses through the first enclosure sidewall 4. In more detail, the plurality of first vent holes 8 is a set of openings that allow air to enter and exit the birdhouse enclosure 1 through the first enclosure sidewall 4. Similarly, in order to allow air to circulate through and out of the second enclosure sidewall 5 and with reference to FIG. 10, the birdhouse enclosure 1 may further comprise a plurality of second vent holes 9. The plurality of second vent holes 9 traverses through the second enclosure sidewall 5. In more detail, the plurality of second vent holes 9 is a set of openings that allow air to enter and exit the birdhouse enclosure 1 through the second enclosure sidewall 5. Thus, a bird can get sufficient air when inside of the birdhouse enclosure 1.

Figure 9:
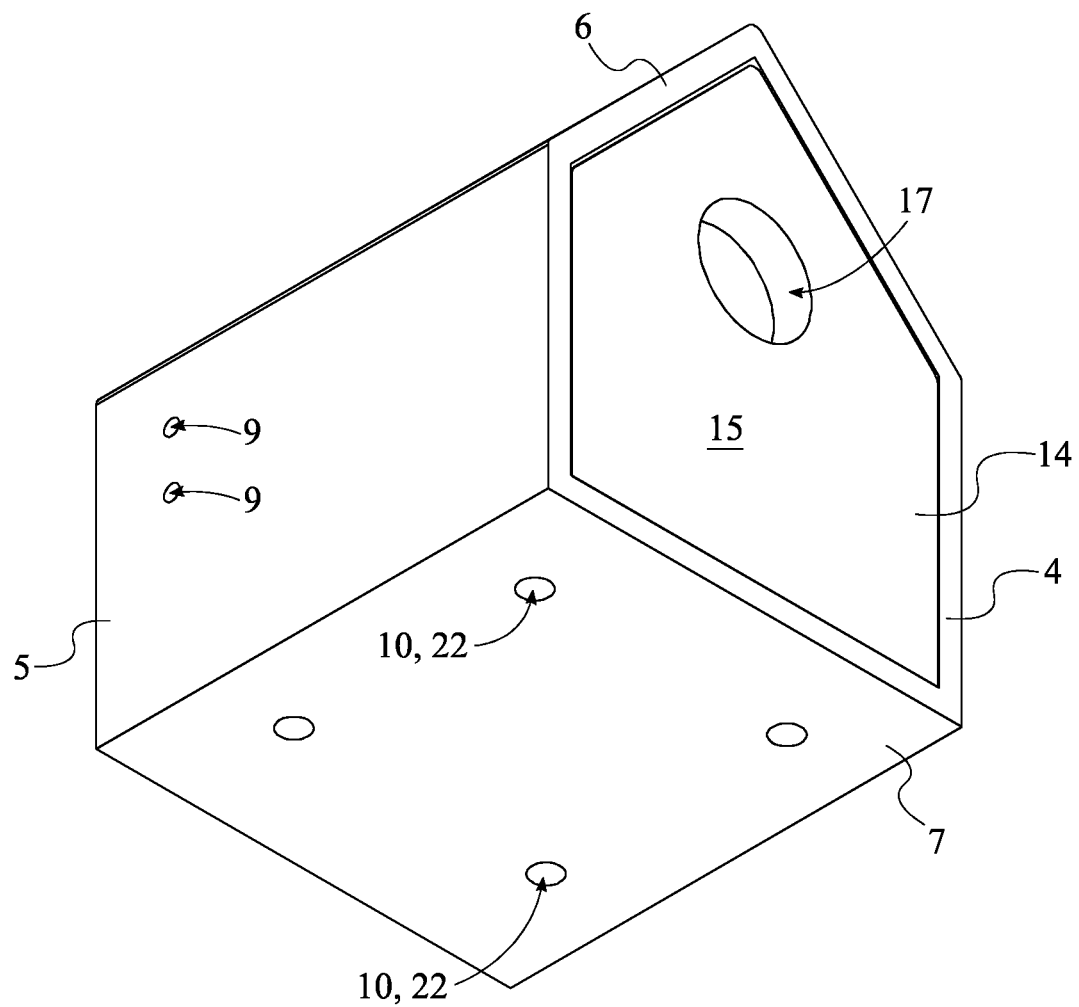
FIG. 9 is a front bottom perspective view of the present invention in the birdhouse configuration.

In order to allow bird excretions, rain, or other substances to be continuously drained from the present invention and with reference to FIGS. 9 and 10, the birdhouse enclosure 1 may further comprise a plurality of first drain holes 10 and the reversible drawer 12 may further comprise a plurality of second drain holes 22. The plurality of first drain holes 10 traverses through the enclosure floor 7. In more detail, the plurality of first drain holes 10 is a set of openings that allow bird excretions, rain, or other substances to be drained from the birdhouse enclosure 1. Similarly, the plurality of second drain holes 22 traverses through the bottom platform 18. In more detail, the plurality of second drain holes 22 is a set of openings that allow bird excretions, rain, or other substances to be drained from the reversible drawer 12. Moreover, each of the second drain holes is positioned concentric with a corresponding first drain hole from the plurality of first drain holes 10. Thus, bird excretions, rain, or other substances drained from the reversible drawer 12 are also drained from the birdhouse enclosure 1.

Figure 12:
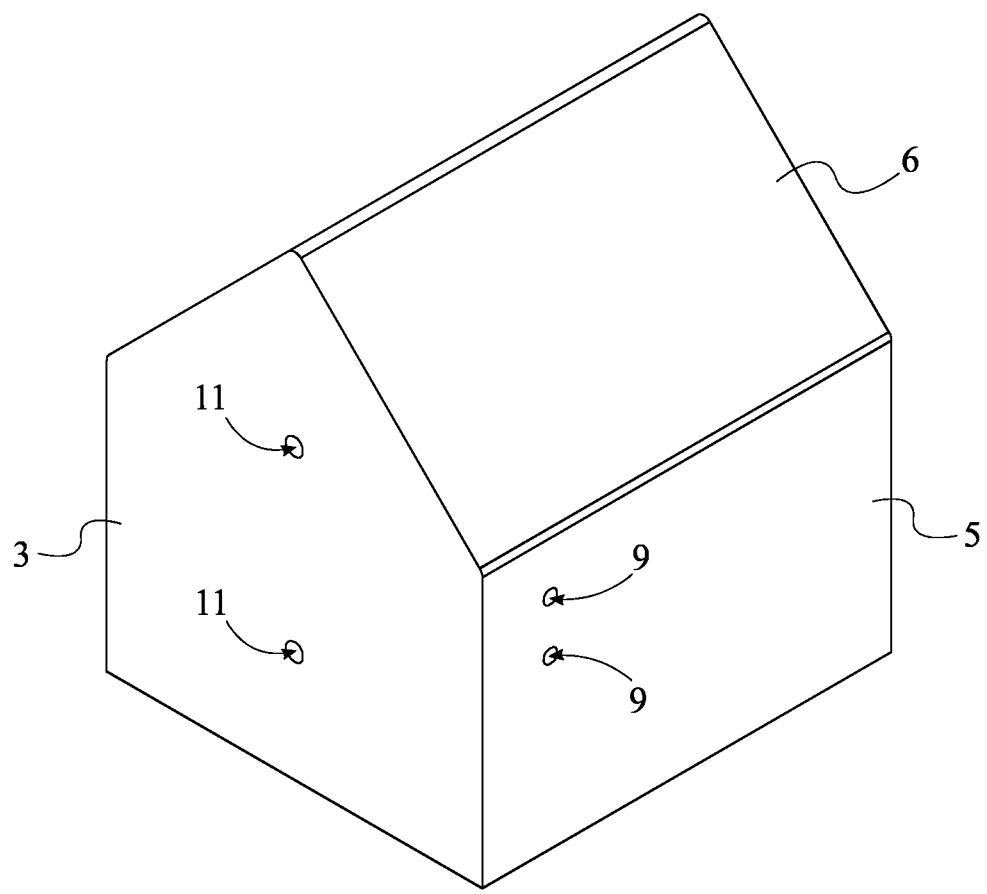
FIG. 12 is a back top perspective view of the present invention in the birdhouse configuration.

In order for the present invention to be mounted to a tree, a building, a fence or other similar surface and with reference to FIG. 12, the birdhouse enclosure 1 may further comprise a plurality of mounting holes 11. The plurality of mounting holes 11 traverses through the enclosure backing 3. In more detail, the plurality of mounting holes 11 are holes that can receive fasteners such as screws or nails in order to mount the present invention to a tree, a building, or other similar item.

As mentioned previously, the present invention can be configured into a birdhouse configuration or birdfeeder configuration. Additionally, the present invention may further comprise an attachment mechanism 23 in order to secure the reversible drawer 12 to the birdhouse enclosure 1 and thus, maintain a desired configuration. With reference to FIGS. 1 through 4, the following arrangements are made for the birdhouse enclosure 1 and the reversible drawer 12 to be in the birdhouse configuration. The ledge 13 is attached against the enclosure backing 3 by the attachment mechanism 23 and the enclosing wall 14 is positioned coincident to the access hole 2. In more detail, the only means for a bird to enter the birdhouse enclosure 1 is through the entrance hole 17 and thus, the present invention acts as a birdhouse. Moreover, the attachment mechanism 23 is preferably a magnetic attachment mechanism and thus, comprises at least one first magnetic piece 24 and at least one second magnetic piece 25. The at least one first magnetic piece 24 may be one or more ferromagnetic plates and the at least one second magnetic piece 25 may be one or more magnets or vise versa. The at least one first magnetic piece 24 is integrated into the enclosure backing 3. In more detail, the at least one first magnetic piece 24 can be positioned within a cavity of the enclosure backing 3 or the at least one first magnetic piece 24 can be mounted to the enclosure backing 3. Similarly, the at least one second magnetic piece 25 is integrated into the ledge 13. In more detail, the at least one second magnetic piece 25 can be positioned within a cavity of the ledge 13 or the at least one second magnetic piece 25 can be mounted to the ledge 13. Further, the at least one second magnetic piece 25 is magnetically coupled to the at least one first magnetic piece 24. Thus, the ledge 13 can be fully secured to the enclosure backing 3 and the birdhouse configuration can be maintained or the ledge 13 can be detached from the enclosure backing 3 when the birdfeeder configuration is desired.

Alternatively and with reference to FIGS. 5 through 8, the following arrangements are made for the birdhouse enclosure 1 and the reversible drawer 12 to be in the birdfeeder configuration. The enclosing wall 14 is attached against the enclosure backing 3 by the attachment mechanism 23 and the ledge 13 is positioned coincident to the access hole 2. In more detail, the only means for a bird to enter the birdhouse enclosure 1 is through a clearance between the ledge 13 and the birdhouse enclosure 1 and bird feed can be freely placed onto the bottom platform 18. Thus, the present invention acts as a birdfeeder. Moreover, the attachment mechanism 23 further comprises at least one third magnetic piece 26. The at least one third magnetic piece 26 may be one or more ferromagnetic plates or one or more magnets. Similarly to the at least one first magnetic piece 24 and the at least one second magnetic piece 25, the at least one third magnetic piece 26 is integrated into the enclosing wall 14. In more detail, the at least one third magnetic piece 26 can be positioned within a cavity of the enclosing wall 14 or the at least one third magnetic piece 26 can be mounted to the enclosing wall 14. Further, the at least one third magnetic piece 26 is magnetically coupled to the at least one first magnetic piece 24. Thus, the enclosing wall 14 can be fully secured to the enclosure backing 3 and the birdfeeder configuration can be maintained or the enclosing wall 14 can be detached from the enclosure backing 3 when the birdhouse configuration is desired.

Alternatively, the attachment mechanism 23 may be another type of attachment mechanism such as, but not limited to, a spring-loaded attachment mechanism, a latch type attachment mechanism, or a keylock attachment mechanism. The arrangement for these other types of attachment mechanisms would conceptually work the same as the magnetic attachment mechanism in which the ledge 13 or the enclosing wall 14 can be selectively attached to the enclosure backing 3 in order to secure the reversible drawer 12 to the birdhouse enclosure 1 and maintain a desired configuration.

In another embodiment of the present invention, the enclosure backing 3 is attached to the enclosure floor 7, first enclosure sidewall 4, the second enclosure sidewall 5, and the gable enclosure roof 6 rather than being permanently connected to the enclosure floor 7, first enclosure sidewall 4, the second enclosure sidewall 5, and the gable enclosure roof 6. This arrangement allows the enclosure floor 7, first enclosure sidewall 4, the second enclosure sidewall 5, and the gable enclosure roof 6 as a whole to be detached from the enclosure backing 3. In more detail, when the present invention is mounted to a building, a tree, a fence, or other similar surface, only the enclosure backing 3 can remain mounted to the building, a tree, a fence, or other similar surface while the rest of the birdhouse enclosure 1 along with reversible drawer 12 can be removed. This allows a user easily clean and maintin the present invention without fully removing the present invention from a building, a tree, a fence, or other similar surface.

Although the invention has been explained in relation to its preferred embodiment, it is to be understood that many other possible modifications and variations can be made without departing from the spirit and scope of the invention as hereinafter claimed.

What is claimed is:

1. A multifunctional birdhouse comprising:
   a birdhouse enclosure;
   a reversible drawer;
   the birdhouse enclosure comprising an access hole and an enclosure backing;

the reversible drawer comprising a ledge, an enclosing wall, an entrance hole, and a bottom platform;
the ledge being connected adjacent to the bottom platform;
the enclosing wall being connected adjacent to the bottom platform, opposite to the ledge;
the entrance hole traversing normal through the enclosing wall;
the access hole and the enclosure backing being positioned opposite to each other about the birdhouse enclosure;
the reversible drawer being positioned through the access hole and against the enclosure backing;
the reversible drawer being slidably engaged with the birdhouse enclosure the birdhouse enclosure further comprising a first enclosure sidewall, a second enclosure sidewall, a gable enclosure roof, and an enclosure floor;
the first enclosure sidewall and the second enclosure sidewall being positioned parallel and offset from each other;
the enclosure floor being connected in between the first enclosure sidewall, the second enclosure sidewall, and the enclosure backing;
the gable enclosure roof being connected in between the first enclosure sidewall, the second enclosure sidewall, and the enclosure backing;
the gable enclosure roof and the enclosure floor being positioned opposite to each other about the birdhouse enclosure;
the access hole being delineated by the gable enclosure roof, the first enclosure sidewall, the second enclosure sidewall, and the enclosure floor;
the birdhouse enclosure further comprising a plurality of first drain holes;
the reversible drawer further comprising a plurality of second drain holes;
the plurality of first drain holes traversing through the enclosure floor;
the plurality of second drain holes traversing through the bottom platform; and
each of the second drain holes being positioned concentric with a corresponding first drain hole from the plurality of first drain holes.

2. The multifunctional birdhouse as claimed in claim 1 comprising:
the reversible drawer further comprising a plurality of elongated grooves;
the enclosing wall comprising a first wall face and a second wall face;
the first wall face being oriented away from the ledge;
the second wall face being oriented towards the ledge;
the plurality of elongated grooves being integrated into the second wall face;
the plurality of elongated grooves being positioned in between the entrance hole and the bottom platform; and
the plurality of elongated grooves being distributed across the second wall face.

3. The multifunctional birdhouse as claimed in claim 1 comprising:
the reversible drawer further comprising a removable perch;
the enclosing wall comprising a first wall face and a second wall face;
the first wall face being oriented away from the ledge;
the second wall face being oriented towards the ledge;
the removable perch being attached normal to the first wall face; and
the removable perch being positioned in between the entrance hole and the bottom platform.

4. The multifunctional birdhouse as claimed in claim 1 comprising:
the reversible drawer further comprising a mesh sheet; and
the mesh sheet being situated across the bottom platform.

5. The multifunctional birdhouse as claimed in claim 1 comprising:
the birdhouse enclosure further comprising a plurality of first vent holes; and
the plurality of first vent holes traversing through the first enclosure sidewall.

6. The multifunctional birdhouse as claimed in claim 1 comprising:
the birdhouse enclosure further comprising a plurality of second vent holes; and
the plurality of second vent holes traversing through the second enclosure sidewall.

7. The multifunctional birdhouse as claimed in claim 1 comprising:
the birdhouse enclosure further comprising a plurality of mounting holes; and
the plurality of mounting holes traversing through the enclosure backing.

8. The multifunctional birdhouse as claimed in claim 1 comprising:
wherein the birdhouse enclosure and the reversible drawer are in a birdhouse configuration;
an attachment mechanism;
the ledge being attached against the enclosure backing by the attachment mechanism; and
the enclosing wall being positioned coincident to the access hole.

9. The multifunctional birdhouse as claimed in claim 8 comprising:
the attachment mechanism comprising at least one first magnetic piece and at least one second piece;
the at least one first magnetic piece being integrated into the enclosure backing;
the at least one second magnetic piece being integrated into the ledge; and
the at least one second magnetic piece being magnetically coupled to the at least one first magnetic piece.

10. The multifunctional birdhouse as claimed in claim 1 comprising:
wherein the birdhouse enclosure and the reversible drawer are in a birdfeeder configuration;
an attachment mechanism;
the enclosing wall being attached against to the enclosure backing by the attachment mechanism; and
the ledge being positioned coincident to the access hole.

11. The multifunctional birdhouse as claimed in claim 10 comprising:
the attachment mechanism comprising at least one first magnetic piece and at least one third magnetic piece;
the at least one first magnetic piece being integrated into the enclosure backing;
the at least one third magnetic piece being integrated into the enclosing wall; and
the at least one third magnetic piece being magnetically coupled to the at least one first magnetic piece.

12. A multifunctional birdhouse comprising:
a birdhouse enclosure;
a reversible drawer;

the birdhouse enclosure comprising an access hole, an enclosure backing, a first enclosure sidewall, a second enclosure sidewall, a gable enclosure roof, and an enclosure floor;

the reversible drawer comprising a ledge, an enclosing wall, an entrance hole, a bottom platform, a mesh sheet, and a plurality of elongated grooves;

the enclosing wall comprising a first wall face and a second wall face;

the ledge being connected adjacent to the bottom platform;

the enclosing wall being connected adjacent to the bottom platform, opposite to the ledge;

the entrance hole traversing normal through the enclosing wall;

the access hole and the enclosure backing being positioned opposite to each other about the birdhouse enclosure;

the reversible drawer being positioned through the access hole and against the enclosure backing;

the reversible drawer being slidably engaged with the birdhouse enclosure;

the first enclosure sidewall and the second enclosure being positioned parallel and offset from each other;

the enclosure floor being connected in between the first enclosure sidewall, the second enclosure sidewall, and the enclosure backing;

the gable enclosure roof being connected in between the first enclosure sidewall, the second enclosure sidewall, and the enclosure backing;

the gable enclosure roof and the enclosure floor being positioned opposite to each other about the birdhouse enclosure;

the access hole being delineated by the gable enclosure roof, the first enclosure sidewall, the second enclosure sidewall, and the enclosure floor; and the mesh sheet being situated across the bottom platform;

the first wall face being oriented away from the ledge;

the second wall face being oriented towards the ledge;

the plurality of elongated grooves being integrated into the second wall face;

the plurality of elongated grooves being positioned in between the entrance hole and the bottom platform;

the plurality of elongated grooves being distributed across the second wall face;

the birdhouse enclosure further comprising a plurality of first vent holes; and a plurality of second vent holes, a plurality of first drain holes and a plurality of mounting holes;

the reversible drawer further comprising a plurality of second drain holes;

the plurality of first vent holes traversing through the first enclosure sidewalk the plurality of second vent holes traversing through the second enclosure sidewall;

the plurality of first drain holes traversing through the enclosure floor;

the plurality of second drain holes traversing through the bottom platform; and each of the second drain holes being positioned concentric with a corresponding first drain hole from the plurality of first drain holes; and the plurality of mounting holes traversing through the enclosure backing.

13. The multifunctional birdhouse as claimed in claim 12 comprising:

the reversible drawer further comprising a removable perch;

the removable perch being attached normal to the first wall face; and the removable perch being positioned in between the entrance hole and the bottom platform.

14. The multifunctional birdhouse as claimed in claim 12 comprising:

wherein the birdhouse enclosure and the reversible drawer are in a birdhouse configuration;

an attachment mechanism;

the ledge being attached against the enclosure backing by the attachment mechanism; and the enclosing wall being positioned coincident to the access hole.

15. The multifunctional birdhouse as claimed in claim 14 comprising:

the attachment mechanism comprising at least one first magnetic piece and at least one second piece;

the at least one first magnetic piece being integrated into the enclosure backing;

the at least one second magnetic piece being integrated into the ledge; and the at least one second magnetic piece being magnetically coupled to the at least one first magnetic piece.

16. The multifunctional birdhouse as claimed in claim 12 comprising:

wherein the birdhouse enclosure and the reversible drawer are in a birdfeeder configuration;

an attachment mechanism;

the enclosing wall being attached against to the enclosure backing by the attachment mechanism; and the ledge being positioned coincident to the access hole.

17. The multifunctional birdhouse as claimed in claim 16 comprising:

the attachment mechanism comprising at least one first magnetic piece and at least one third magnetic piece;

the at least one first magnetic piece being integrated into the enclosure backing;

the at least one third magnetic piece being integrated into the enclosing wall; and the at least one third magnetic piece being magnetically coupled to the at least one first magnetic piece.

* * * * *